United States Patent
Servantie et al.

(10) Patent No.: US 10,810,887 B2
(45) Date of Patent: Oct. 20, 2020

(54) METHOD OF VISUALIZATION OF THE TRAFFIC AROUND OF A REFERENCE AIRCRAFT IN A NON-COMPLIANT DISPLAY ZONE, ASSOCIATED COMPUTER PRODUCT PROGRAM AND VISUALIZATION SYSTEM

(71) Applicant: THALES, Courbevoie (FR)

(72) Inventors: Xavier Servantie, Merignac (FR); Florent Mennechet, Merignac (FR)

(73) Assignee: THALES, Courbevoie (FR)

( * ) Notice: Subject to any disclaimer, the term of this patent is extended or adjusted under 35 U.S.C. 154(b) by 273 days.

(21) Appl. No.: 15/958,345

(22) Filed: Apr. 20, 2018

(65) Prior Publication Data
US 2018/0315321 A1 Nov. 1, 2018

(30) Foreign Application Priority Data

Apr. 26, 2017 (FR) ...................................... 17 00457

(51) Int. Cl.
| | | |
|---|---|---|
| *G08G 5/00* | (2006.01) | |
| *B64D 43/00* | (2006.01) | |
| *G08G 5/04* | (2006.01) | |
| *G01C 23/00* | (2006.01) | |
| *G02B 27/01* | (2006.01) | |

(52) U.S. Cl.
CPC ........... *G08G 5/0021* (2013.01); *B64D 43/00* (2013.01); *G01C 23/00* (2013.01); *G08G 5/0078* (2013.01); *G08G 5/04* (2013.01); *G08G 5/045* (2013.01); *G02B 27/01* (2013.01)

(58) Field of Classification Search
None
See application file for complete search history.

(56) References Cited

U.S. PATENT DOCUMENTS

| | | | |
|---|---|---|---|
| 6,690,299 B1 * | 2/2004 | Suiter | G01C 23/005 340/973 |
| 2007/0001874 A1 | 1/2007 | Feyereisen et al. | |
| 2010/0082184 A1 * | 4/2010 | Nichols | G06T 11/206 701/3 |

OTHER PUBLICATIONS

French Search Report for French Application No. FR 17 00457 dated Dec. 13, 2017.

* cited by examiner

*Primary Examiner* — Todd Melton
*Assistant Examiner* — Jason R Roberson
(74) *Attorney, Agent, or Firm* — Pearne & Gordon LLP

(57) ABSTRACT

The present invention relates to a method for displaying traffic in the vicinity of a reference aircraft in a non-compliant display zone, and comprising the following steps: acquisition (110) of a position of one of the surrounding aircraft and determination of a relative two-dimensional position of the surrounding aircraft relative to the reference aircraft in a real plane and at a relative altitude; associating (120) a traffic symbol with the surrounding aircraft; determination (130) of a two-dimensional position of the reference aircraft in a virtual plane representative of the real plane; displaying (140) in perspective the virtual plane and the traffic symbol at the distance of the two-dimensional position of the reference aircraft in this virtual plane.

7 Claims, 2 Drawing Sheets

METHOD OF VISUALIZATION OF THE TRAFFIC AROUND OF A REFERENCE AIRCRAFT IN A NON-COMPLIANT DISPLAY ZONE, ASSOCIATED COMPUTER PRODUCT PROGRAM AND VISUALIZATION SYSTEM

CROSS-REFERENCE TO RELATED APPLICATIONS

This application claims the benefit of French Application No. 17 00457, filed on Apr. 26, 2017, which is incorporated herein by reference in its entirety.

FILED OF THE INVENTION

The present invention relates to a method for visualizing traffic in the vicinity of a reference aircraft.

The present invention also relates to a computer program product and an associated display system.

BACKGROUND OF THE INVENTION

Various systems for visualizing the state of traffic in the vicinity of an aircraft already exist in the prior art.

Thus, for example, the Traffic alert and Collision Avoidance System (TCAS) provides a two-dimensional graphical representation of surrounding aircraft based on their horizontal distance to the given aircraft.

In particular, in such a representation, each of the surrounding aircraft is represented by a symbol placed on a radius emanating from a symbol representing the given aircraft, and in proportion to the horizontal distance separating the aircraft.

The display of each symbol is accompanied by information relating to the altitude of the corresponding surrounding aircraft. Moreover, the color and shape of such a symbol indicate potential conflicts between the reference aircraft and the corresponding surrounding aircraft.

A so-called head-up display system is also known which makes it possible to project the three-dimensional position of each aircraft onto a transparent surface placed in front of the pilot.

Each of the surrounding aircraft is represented on such a surface in the form of a graphical representation which is then placed in the pilot's line of vision towards the surrounding aircraft.

This type of display is known in the prior art by the term "compliant" because it relates to the actual position of the aircraft and thus displays the information of the real landscape. For this, it depends directly on the position of the aircraft, the attitude of the aircraft and the orientation of the line of vision of the pilot.

As opposed to the term "compliant", the TCAS system display type mentioned above is known in the prior art as "non-compliant". In particular, this type of display depends on the speed vector of the aircraft and does not change with the changes in attitude of the latter.

SUMMARY OF THE INVENTION

However, the use of one or other of the above-mentioned display systems or even both systems at the same time is not sufficiently convenient for the pilot.

In fact, by using the information given by these systems, it is generally difficult for the pilot to evaluate the altitudes of the surrounding aircraft, as well as their speeds and approach dynamics.

The present invention aims to improve the perception of the traffic state by the pilot. In particular, it enables him to better assess the altitudes and the approach speeds of the surrounding aircraft.

To this end, the object of the invention is to provide a method for visualizing traffic in the vicinity of a reference aircraft moving close to a plurality of surrounding aircraft.

The method comprises the following steps that are implemented for each of the surrounding aircraft:

acquisition of a relative or absolute position of the surrounding aircraft and determination of a relative two-dimensional position of the surrounding aircraft relative to the reference aircraft in a real plane corresponding to the horizontal plane comprising the reference aircraft, and a relative altitude corresponding to the distance separating the surrounding aircraft from the real plane;

association of a traffic symbol with the surrounding aircraft;

determination of a two-dimensional position of the reference aircraft in a virtual plane representative of the real plane, as a function of the two-dimensional relative position of the surrounding aircraft in the real plane;

visualization in perspective of the virtual plane and the traffic symbol at a distance from the two-dimensional position of the reference aircraft in this virtual plane, according to a direction perpendicular to the virtual plane and as a function of the relative altitude.

According to other advantageous aspects of the invention, the method comprises one or more of the following characteristics, taken in isolation or in any technically feasible combination:

said distance is proportional to the relative altitude when the absolute value of the relative altitude is lower than a predetermined threshold, while it is equal to a fixed value in the contrary case;

the traffic symbol is displayed above or below the virtual plane according to the sign of the relative altitude;

the virtual perspective plane and the traffic symbol are displayed in a non-compliant display zone of a traffic status display, preferably independently of the angle of inclination of the reference aircraft;

the traffic status display furthermore comprises a compliant display zone comprising, for each of the surrounding aircraft, a graphical representation arranged in this display zone in a position corresponding to the projection of the actual position of the surrounding aircraft on the compliant display zone;

the non-compliant display zone is arranged below the compliant display zone;

the method further comprises, for each of the surrounding aircraft, a step of displaying a link between the traffic symbol associated with the surrounding aircraft in the non-compliant display zone and the graphical representation of the surrounding aircraft in the compliant display zone; and the traffic status display is a head-up display or a head-down display;

The invention also relates to a computer program product comprising software instructions which, when implemented by computer equipment, implement a method as defined above.

The invention also relates to a traffic display system representing the vicinity of a reference aircraft moving near a plurality of surrounding aircraft.

The system comprises an acquisition module configured to acquire a relative or absolute position of the surrounding aircraft and to determine a relative two-dimensional position of the surrounding aircraft relative to the reference aircraft in a real plane corresponding to the horizontal plane comprising the reference aircraft, and a relative altitude corresponding to the distance separating the surrounding aircraft from the real plane; a processing module that is configured to associate a traffic symbol with the surrounding aircraft and to determine a two-dimensional position of the reference aircraft in a virtual plane representative of the real plane and as a function of the relative two-dimensional position of the surrounding aircraft in the real plane; and a display module that is configured to display the virtual plane in perspective and the traffic symbol at a distance from the two-dimensional position of the reference aircraft in this virtual plane, according to a direction perpendicular to the virtual plane and as a function of the relative altitude.

BRIEF DESCRIPTION OF THE DRAWINGS

These features and advantages of the invention will become apparent upon reading the description which follows, given solely by way of a non-limiting example, and with reference to the appended drawings, wherein.

DETAILS DESCRIPTION OF THE INVENTION

Figure 1:
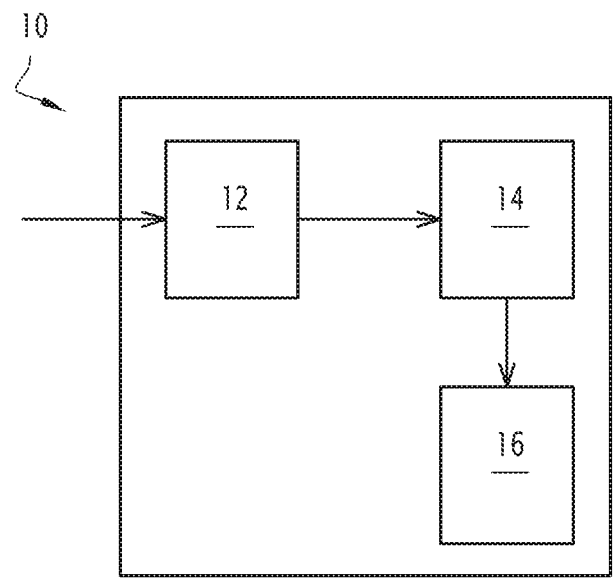
FIG. 1 shows a schematic view of a display system according to the invention.

The display system 10 of FIG. 1 is on board an aircraft, hereinafter referred to as the reference aircraft, and makes it possible to display the traffic state around this reference aircraft.

The term "reference aircraft" here refers to any aircraft or helicopter or any other flying machine pilotable by a pilot from this device.

According to another exemplary embodiment, the reference aircraft is a remotely controllable drone. In this case, the display system 10 is located in a control center, for example terrestrial, from which the piloting of the drone is performed.

With reference to FIG. 1, the display system 10 comprises an acquisition module 12, a processing module 14 and a display module 16.

The acquisition module 12 is for example an electronic module for acquiring positions of aircraft in the vicinity of the reference aircraft. These aircrafts are subsequently described as surrounding aircraft.

As in the case of the reference aircraft, the term "surrounding aircraft" refers to any aircraft or helicopter or other flying device such as a drone, for example.

In particular, the acquisition module 12 is able to acquire positions of the surrounding aircrafts located at a distance less than a predetermined maximum distance from the reference aircraft. The predetermined maximum distance is equal for example to 20 NM or to the distance corresponding to 3 minutes of flight of the reference aircraft.

These positions are provided by on board systems known per se, such as, for example, the TCAS traffic alert and collision avoidance system, the ADS-B type surveillance system (Automatic Dependent Surveillance Broadcast) or radar.

Each position acquired is, for example, a relative position of the surrounding aircraft, i.e. a position determined relative to the reference aircraft, or an absolute position of the surrounding aircraft, i.e. a fixed position relative to a fixed geographical landmark (typically a latitude, longitude, altitude). Each acquired position is thus in the form of at least three coordinates.

From the relative or absolute acquired position, the acquisition module 12 is able to determine for the corresponding surrounding aircraft, a relative two-dimensional position in the horizontal plane comprising the reference aircraft, and a relative altitude corresponding to the distance separating the surrounding aircraft from this horizontal plane.

In the following, the horizontal plane comprising the reference aircraft will be referred to as the "real plane".

Each relative two-dimensional position comprises a horizontal distance corresponding to the distance separating the reference aircraft from the orthogonal projection of the position of the reference aircraft on the real plane, and a horizontal angle corresponding to the angle formed between a reference axis and the line connecting the position of the reference aircraft and this projection, and also referred to as the bearing.

It should be noted that each acquired relative altitude has a positive sign when the corresponding surrounding aircraft is/are above the real plane and a negative sign when the corresponding surrounding aircraft is/are below the real plane.

The processing module 14 is, for example, a computer capable of implementing software for commanding the display module 16 to display the state of traffic around the reference aircraft, from the positions acquired by the module of acquisition 12, as will be explained later.

The display module 16 is able to implement a traffic status display 20 from the commands given by the processing module 14.

In particular, according to the example described here, the display module 16 is in the form of a so-called head-up display, which may be a device also known by the acronym HUD ("Head-Up Display") or equipment known by the acronym HMD ("Helmet Mounted Display") or any other solution for displaying information superimposed on the real landscape.

For this purpose, the display module 16 comprises a display surface and projection means projecting light rays onto the display surface in order to display the necessary information. The display surface is arranged, for example, in the line of vision of the pilot outside the reference aircraft and, advantageously, uses the windshield or at least a portion of the windshield of the cockpit of the aircraft of reference. Alternatively, the display surface may be in the form of an at least partially transparent screen arranged in front of the pilot, or a helmet worn by the pilot.

According to another exemplary embodiment, the display module 16 may be in the form of a so-called head-down display. In this case, the display module 16 is arranged under the line of vision of the pilot outside the aircraft and comprises, in particular, a display screen known per se, and which is, for example, associated with a display of the SVS type (Synthetic Vision System). This type of display makes it possible to represent a synthetic scene that is representative of the actual scene. Thus the principle of compliant representation of the traffic may be applied to a scene of the SVS type, and thus to be compliant in the SVS type scene (and no longer the landscape).

Figure 3:
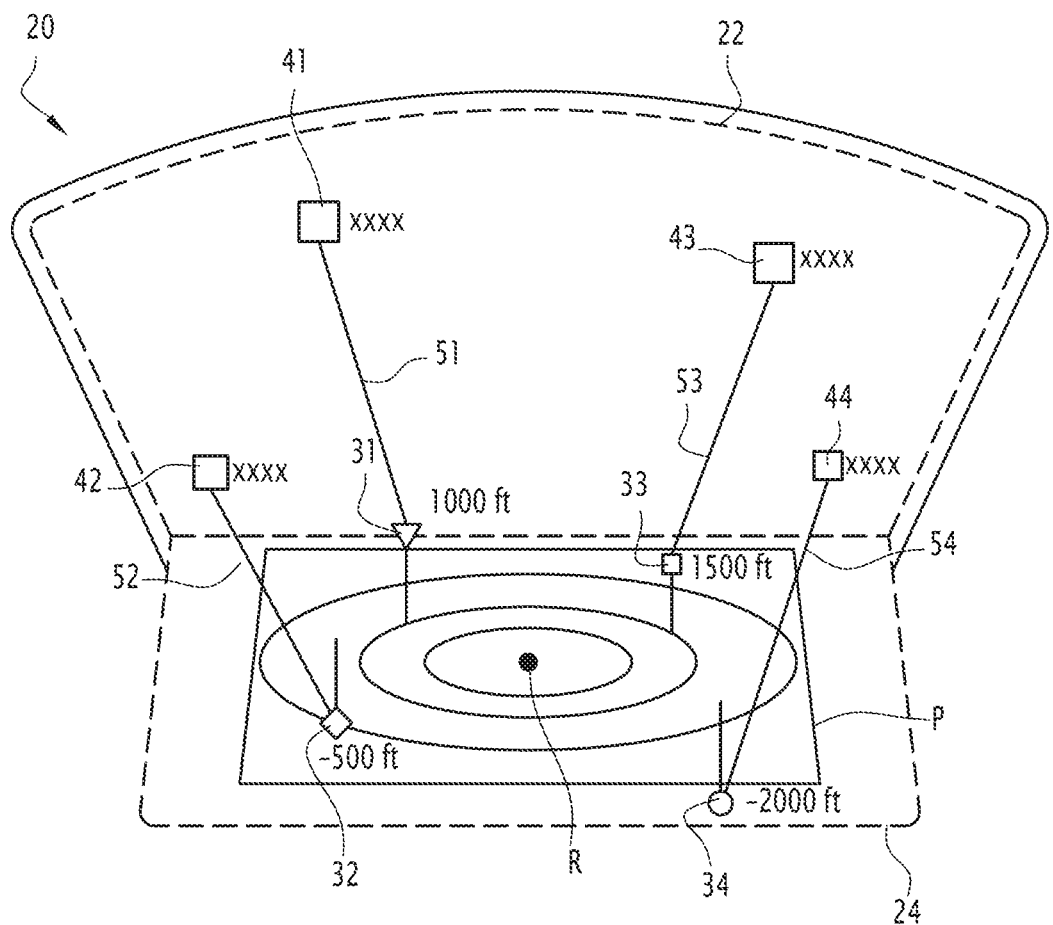
FIG. 3 shows a schematic view illustrating the implementation of the method of FIG. 2.

The traffic status display 20 is shown in more detail in FIG. 3.

Thus, with reference to FIG. 3, the traffic status display 20 comprises a compliant display zone 22 and a non-compliant display zone 24. The non-compliant display zone 24 is, for example, arranged below the compliant display zone 22.

In a manner known per se, the compliant display zone 22 makes it possible to visualize the positions of the surrounding aircraft by projecting these positions on the corresponding display surface or on the corresponding display screen, wherein it is superimposed on the real landscape. This type of display is therefore dependent on the current attitude of the reference aircraft.

When the display module 16 is in the form of a head-down display, the compliant display zone 22 is implemented according to the principles of pseudo-compliance according to methods known per se. This means, in particular, that the compliant display zone 22 has an augmented reality compared to the display of the non-compliant display zone 24 by incorporating at least some principles of the head-up display.

The non-compliant display zone 24 makes it possible to display the positions of the surrounding aircraft as a function, in particular, of the direction of the horizontal component of the reference aircraft speed vector. This type of display is, for example, independent of the current attitude of the reference aircraft and, in particular, its pitch, roll and heading orientation.

Figure 2:
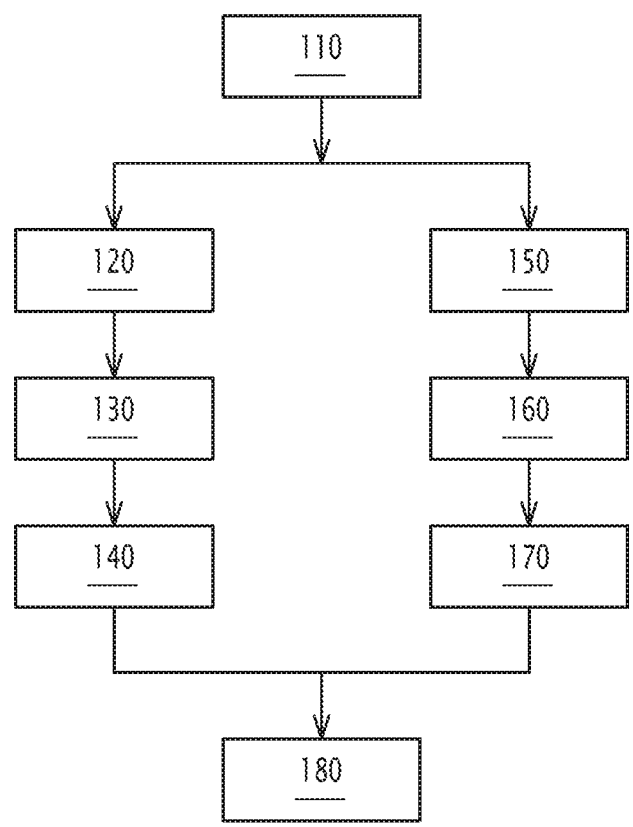
FIG. 2 shows a flowchart of a display method according to the invention, wherein the method is implemented by the display system of FIG. 1.

The display method according to the invention makes it possible to implement the display in the two display zones 22, 24 and it will now be explained with reference to FIG. 2 by presenting a flowchart of the steps, and with reference to FIG. 3 which schematically illustrates the display zones 22, 24.

The steps of this method will be explained with reference to one of the surrounding aircrafts at the time of acquisition of its current relative position by the acquisition module 12. These steps are repeated in a similar manner for each new position of this aircraft, as well as for each of the other surrounding aircrafts.

During the initial step 110, the acquisition module 12 acquires the relative position of the surrounding aircraft.

Then, from this position, the acquisition module 12 determines a two-dimensional position of this aircraft in the real plane and its relative altitude. The two-dimensional position includes the horizontal distance between the reference aircraft and the surrounding aircraft, as well as the corresponding horizontal angle.

At the end of this step 110, the acquisition module 12 transmits the relative position acquired to the processing module 14.

Then, the processing module 14 implements steps 120 to 140 to display the position of the surrounding aircraft in the non-compliant display zone 24 in parallel with steps 150 to 170 to display the position of the surrounding aircraft in the compliant display zone 22.

In step 120, the processing module 14 associates a traffic symbol with the surrounding aircraft. This symbol has, for example, a two-dimensional figure such as a triangle, a square, a diamond, etc. Different figures may, for example, be associated with different surrounding aircraft.

Moreover, each two-dimensional figure has at least one characteristic that varies as a function of the proximity of the surrounding aircraft to the reference aircraft. This characteristic is, for example, the color of the symbol.

Optionally, in this step 120, the processing module 14 furthermore associates additional information relating to the surrounding aircraft with the traffic symbol such as, for example, its identifier, its relative or absolute altitude, its speed, direction of travel. etc.

In the following step 130, the processing module 14 determines a two-dimensional position of the surrounding aircraft in a virtual plane representative of the real plane and intended to be displayed in the non-compliant display zone 24.

The two-dimensional position of the surrounding aircraft in the virtual plane is determined according to the two-dimensional position of this aircraft in the real plane.

In particular, according to an exemplary embodiment, the virtual plane has a polar coordinate system wherein the origin is associated with the current position of the reference aircraft. The orientation of this coordinate system is, for example, determined according to the orientation of the horizontal component of the reference aircraft speed vector.

In this case, the two-dimensional position of the traffic symbol comprises a radial coordinate and an angular coordinate.

Thus, according to this example, the radial coordinate of the traffic symbol is determined according to the horizontal distance between the reference aircraft and the surrounding aircraft, while the angular coordinate is determined as a function of the corresponding horizontal angle.

In the next step 140, the processing module 14 controls the display module 16 to display the virtual plane in perspective in the non-compliant display zone 24.

FIG. 3 illustrates such a representation of the virtual plane which is designated by the reference "P" in this figure.

In particular, in this virtual plane P of FIG. 3, the point R or any other suitable symbol is placed substantially in the center of the non-compliant display zone 24 to represent the reference aircraft.

The virtual plane P further comprises circles with the point R as the origin, and representing the set of points at the same distance in the area of the reference aircraft. These circles are spaced, for example, at the same distance. The circle farthest from the point R corresponding, for example, to all the points in the space remote from the reference aircraft at the maximum distance that is substantially equal to 20 NM.

According to an exemplary embodiment, the virtual plane P further comprises a scale indicating for each circle, the distance in space of the points of these circles from the reference aircraft.

Of course, just like the virtual plane P, the circles are viewed in perspective.

Then, the processing module 14 commands the display module 16 to display the traffic symbol associated with the surrounding aircraft during the step 120 in the non-compliant display zone 24.

In particular, the traffic symbol is displayed in this zone 24 at the distance of the two-dimensional position determined during step 130 in a direction perpendicular to the virtual plane P and as a function of the relative altitude.

The value of this distance is proportional to the relative altitude when the absolute value of the relative altitude is lower than a predetermined threshold and is equal to a fixed value in the contrary case. The predetermined threshold is equal, for example, to 2000 ft.

The traffic symbol is viewed above the virtual plane P when the sign of the relative altitude is positive, and below the virtual plane P when the sign of the relative altitude is negative.

Thus, as may be seen in FIG. 3 during step 140, the display module 16 displays a triangle 31 associated with the surrounding aircraft at the distance from the virtual plane P whose value is proportional to the relative altitude of this aircraft. The triangle 31 is displayed above the virtual plane P, which means that the surrounding aircraft is above the reference aircraft.

Optionally, during the same step, the processing module 14 commands the display module 16 to display at least some additional information that is associated with the corresponding traffic symbol.

Thus, in the example of FIG. 3, the value of the relative altitude of the surrounding aircraft that is equal to 1000 ft is displayed near the triangle 31.

In addition, during this step, the display module 16 displays a specific symbol near the traffic symbol when the absolute value of the relative altitude exceeds the predetermined threshold.

The other traffic symbols displayed in the non-compliant display zone 24, namely the rhombus 32, the square 33 and the disc 34, are associated with other surrounding aircraft and are displayed by the display module 14 during the previous iterations of steps 110 to 140.

In step 150, which is then implemented in parallel with step 120, the processing module 14 associates a graphic representation with the surrounding aircraft. This representation has, for example, a three-dimensional figure such as a parallelepiped or a sphere.

As in the case of traffic symbols, different three-dimensional figures may be associated with different surrounding aircraft.

Moreover, at least one characteristic of the three-dimensional figure, such as its color for example, may vary as a function of the proximity of the surrounding aircraft.

As in step 120, in step 150, the processing module 14 optionally associates additional information relating to the surrounding aircraft with the graphic representation, such as, for example, its identifier.

In the following step 160, the processing module 14 determines a position of the graphical representation in the compliant display zone 22. This position is, for example, determined by making a projection of a type that is adapted to the actual position of the surrounding aircraft on the display surface using methods known per se.

The position of the graphical representation in the compliant display zone 22 therefore depends on the attitude of the reference aircraft.

Then, in the next step 170, the processing module 14 commands the display module 16 to display the graphic representation in the compliant display zone 22 in the position determined in step 160.

Optionally, as in step 140, in step 170, the processing module 14 commands the display module 16 to display at least some additional information that is associated with the corresponding graphical representation.

Thus, in FIG. 3, the graphical representation associated with the surrounding aircraft corresponds to the square 41 which is, for example, displayed with the identifier of the surrounding aircraft.

The other graphic representations displayed in the compliant display zone 22, i.e. the squares 42, 43 and 44, are displayed by the display module 14 during the previous iterations of the steps 150 to 170.

Finally, in step 180 which provides a particular advantage of the invention, the processing module 14 commands the display module 16 to display a link between the traffic symbol associated with the surrounding aircraft in the non-compliant display zone 24 and the graphical representation of this surrounding aircraft in the compliant display zone 22.

In particular, as shown in FIG. 3, in this step 180, the display module 16 displays a link 51 between the triangle 31 and the square 41.

The other links shown in FIG. 3 between the compliant display zone 22 and the non-compliant display zone 24, i.e. the links 51 to 54, are displayed by the display module 14 during the previous iterations of the step 180.

It will be appreciated that the present invention offers a number of advantages.

First of all, the method according to the invention proposes the display of a virtual plane that is representative of a horizontal reality in perspective in the non-compliant display zone.

This type of display then allows the pilot to quickly distinguish surrounding aircrafts below and above the reference aircraft.

It should be noted that this is not possible with existing non-compliant display systems such as for example the TCAS system. In fact, only careful reading of the TCAS system display allows the pilot to perceive the relative positions of the surrounding aircraft relative to the horizontal plane defined by the reference aircraft.

In addition, the use of the links of the compliant display to the non-compliant display according to the invention allows the pilot to quickly locate the graphical representation and the traffic symbol corresponding to the same reference aircraft.

These links allow the pilot to simultaneously enjoy the benefits of both display systems which significantly reducing the workload of the pilot.

In fact, according to the known systems in the prior art, to pass, for example, from a compliant display system to a non-compliant display system and to know, for example, the precise horizontal distance to one of the surrounding aircraft visible on the compliant display system, it is necessary to find this aircraft on the non-compliant display system by identifying, for example, the identifiers of these aircraft on both display systems.

It is thus conceivable that the invention may make it possible to overcome the drawbacks of the prior art and to improve generally the perception of the traffic status by the pilot.

The invention claimed is:

1. Method of displaying traffic in the vicinity of a reference aircraft moving near a plurality of surrounding aircraft;
   wherein the method comprises the following steps implemented for each of the surrounding aircraft:
   acquisition of a relative or absolute position of the surrounding aircraft and determination of a relative two-dimensional position of the surrounding aircraft with respect to the reference aircraft in a real plane corresponding to the horizontal plane comprising the reference aircraft, and a relative altitude corresponding to the distance separating the surrounding aircraft from the real plane;
   association of a traffic symbol with the surrounding aircraft;
   determination of a two-dimensional position of the reference aircraft in a virtual plane that is representative of the real plane, as a function of the relative two-dimensional position of the surrounding aircraft in the real plane;
   visualization in perspective, the visualization comprising the visualization of the virtual plane and the visualization of the traffic symbol at a distance from the two-dimensional position of the reference aircraft in the virtual plane, the distance being oriented along a direction perpendicular to the virtual plane and being a function of the relative altitude; and wherein the virtual plane in perspective and the traffic symbol are displayed in a non-compliant display zone of a traffic status display, wherein the traffic status display comprises a compliant display zone having for each surrounding aircraft a graphical representation displayed in the compliant display zone in a position corresponding to a projection of a real position of the surrounding aircraft on the compliant display zone, and for each surrounding aircraft, displaying a link between the traffic symbols associated with the surrounding aircraft in the non-compliant display zone, and the graphical representation of the surrounding aircraft in the compliant display zone, and wherein the traffic status display is a head-up display or a head-down display.

2. Method according to claim 1, wherein said distance is proportional to the relative altitude when the absolute value of the relative altitude is less than a predetermined threshold and is otherwise equal to a fixed value.

3. Method according to claim 1, wherein the traffic symbol is viewed above or below the virtual plane as a function of a relative altitude sign.

4. Method according to claim 1, wherein the non-compliant display zone is displayed below the compliant display zone.

5. Display system for traffic in the vicinity of a reference aircraft moving near a plurality of surrounding aircraft;

wherein the system comprises:

an acquisition module configured to acquire a relative or absolute position of the surrounding aircraft and to determine a relative two-dimensional position of the surrounding aircraft relative to the reference aircraft in a corresponding real plane in the horizontal plane comprising the reference aircraft, and a relative altitude corresponding to the distance separating the surrounding aircraft from the real plane;

a processing module configured to associate a traffic symbol with the surrounding aircraft and to determine a two-dimensional position of the reference aircraft in a virtual plane that is representative of the real plane as a function of the relative two-dimensional position of the surrounding aircraft in the real plane; and a display module configured to display in perspective the virtual plane and the traffic symbol at a distance from the two-dimensional position of the reference aircraft in the virtual plane, the distance being oriented along a direction perpendicular to the virtual plane and being a function of the relative altitude, and wherein the virtual plane in perspective and the traffic symbol are displayed in a non-compliant display zone of a traffic status display, wherein the traffic status display comprises a compliant display zone having for each surrounding aircraft a graphical representation displayed in the compliant display zone in a position corresponding to a projection of a real position of the surrounding aircraft on the compliant display zone, and for each surrounding aircraft, display a link between the traffic symbols associated with the surrounding aircraft in the non-compliant display zone, and the graphical representation of the surrounding aircraft in the compliant display zone, wherein the traffic status display is a head-up display or a head-down display.

6. Method according to claim 1, wherein the virtual plane in perspective and the traffic symbol are displayed independently on the angle of inclination of the reference aircraft.

7. A non-transitory computer-readable medium including a computer program comprising software instructions which, when executed by a computer, implement the method according to claim 1.

* * * * *